United States Patent Office 3,646,085
Patented Feb. 29, 1972

3,646,085
PERFLUOROALKYLETHERAMIDOALKYL-TRIALKOXYSILANES
Philip Lee Bartlett, Wilmington, Del., assignor to E. I. du Pont de Nemours and Company, Wilmington, Del.
No Drawing. Filed Sept. 24, 1970, Ser. No. 75,303
Int. Cl. C07f 7/04, 7/18
U.S. Cl. 260—448.8 R
6 Claims

ABSTRACT OF THE DISCLOSURE

Perfluoroalkyletheramidoalkyltrialkoxysilanes having the formula $R_fO[C_3F_6O]_nCF(CF_3)CON(R)R'Si(OR'')_3$ wherein $R_f$ is a perfluoroalkyl radical having from 1 to 6 carbon atoms, $n$ is an integer from 0 to 8, R is hydrogen or an alkyl group having from 1 to 6 carbon atoms and R' is an alkylene having from 1 to 12 carbon atoms or a $$-CH_2-CH_2\overset{H}{N}-CH_2CH_2CH_2-$$

group, and R'' is an alkyl radical having from 1 to 6 carbon atoms. The novel compounds are useful as water repellents.

BACKGROUND OF THE INVENTION

(1) Field of the invention

This invention relates to perfluoroalkyletheramidoalkyltrialkoxysilanes having the formula $$R_fO[C_3F_6O]_nCF(CF_3)CON(R)R'Si(OR'')_3$$

wherein $R_f$ is a perfluoroalkyl radical having from 1 to 6 carbon atoms, $n$ is an integer from 0 to 8, R is hydrogen or an alkyl group having from 1 to 6 carbon atoms and R' is an alkylene having from 1 to 12 carbon atoms or a $$-CH_2-CH_2\overset{H}{N}-CH_2CH_2CH_2-$$

group, and R'' is an alkyl radical having from 1 to 6 carbon atoms which are useful as corrosion inhibiting agents for metals, for imparting oil and water repellency to glass surfaces and for imparting scratch-resistance to glass surfaces.

(2) Description of the prior art

Organosiloxanes are recognized in the art for their water-repellent characteristics and have found considerable acceptance in rendering such materials as masonry and fibrous materials water resistant. The durable organosiloxane treatment is normally effected by treating the substrate with substituted silanes such as $R_2SiCl_2$ which contains the readily hydrolyzable grouping of Si—Cl. The silane is presumably hydrolyzed by the surface water of the substrate to initially form silanediols which can condense further to form organosiloxanes. The durability of siloxane is derived primarily from the reaction of the hydrolyzable grouping with the water adsorbed on the surface of the substrate and thus the organosiloxane is "anchored" on to the substrate surface. An objectionable feature of using halogenated silanes to form organosiloxane on the surface of a substrate is that hydrogen halide is a product of the hydrolysis. Thus in any large scale application of halogenated silanes, provisions for the removal of the evolved hydrogen halide are required.

To overcome this difficulty, the use of low molecular weight organopolysiloxanes has been suggested in the art for suitable silicon-containing surface-treating compositions. However, since the durability of a silicon-containing composition depends largely on the reaction of the silicon compound with the water adsorbed on the surface of the substrate, it is clear that with preformed organopolysiloxanes the degree of adherence to the substrate surface is necessarily considerably lessened.

Holbrook and Steward in U.S. 3,012,006 disclose fluorinated siloxanes and their use as oil-repelling agents. The siloxane consists of a siloxane unit of the formula $$C_nF_{2n+1}Y_mR\overset{H}{S}iO$$

wherein $n$ is an integer from 2 to 18 inclusive, R is a divalent aliphatic hydrocarbon radical, $m$ is 0 or 1, Y is a divalent aliphatic radical containing a functional linkage of the group ester, ether, amine and amide there being a total of less than 18 atoms exclusive of hydrogen in Y and R.

Novel compounds have now been discovered which are useful in imparting oil and water repellency to glass surfaces; which impart corrosion-resistance to metals; which render the surface of glass scratch-resistant; and which are highly resistant to removal from the treated surfaces.

SUMMARY OF THE INVENTION

Perfluoroalkyletheramidoalkyltrialkoxysilanes having the formula $R_fO[C_3F_6O]_nCF(CF_3)CON(R)R'Si(OR'')_3$ wherein $R_f$ is a perfluoroalkyl radical having from 1 to 6 carbon atoms, $n$ is an integer from 0 to 8, R is hydrogen or an alkyl group having from 1 to 6 carbon atoms and R' is an alkylene having from 1 to 12 carbon atoms or a $$-CH_2-CH_2\overset{H}{N}-CH_2CH_2CH_2-$$

group, and R'' is an alkyl radical having from 1 to 6 carbon atoms.

DESCRIPTION OF THE INVENTION

The compounds of this invention are perfluoroalkyletheramidoalkyltrialkoxysilanes of the formula $$R_fO[CF(CF_3)CF_2O]_nCF(CF_3)CON(R)R'Si(OR'')_3$$

wherein $R_f$ is perfluoroalkyl group having from 1 to 6 carbon atoms, $n$ is an integer of 0 to 8, R is a hydrogen or an alkyl group having from 1 to 6 carbon atoms, R' is a divalent connecting group which is a branched or straight chained alkylene group having from 1 to 12 carbon atoms or $$-CH_2-CH_2\overset{H}{N}-CH_2CH_2CH_2-$$

and R'' is an alkyl group having from 1 to 6 carbon atoms.

The starting materials used in preparing the compounds of this invention are perfluoroalkyl ether acid fluorides of the formula $R_fO(C_3F_6O)CF(CF_3)CFO$. These acid fluorides are available from two sources, polymerization of hexafluoropropylene oxide and polymerization of mixtures of hexafluoropropylene and oxygen.

Acid fluorides prepared by the polymerization of hexafluoropropylene oxide are described by Moore et al. in U.S. 3,250,808 and have the structure $$R_fO[CF(CF_3)CF_2O]_nCF(CF_3)CFO$$

If hexafluoropropylene oxide alone is polymerized, the products have the structure $$n\text{-}C_3F_7O[CF(CF_3)CF_2O]_nCF(CF_3)CFO$$

and are fully described by Moore et al. in Canadian Patent 725,740. If the polymerization is carried out in the presence of carbonyl fluoride ($COF_2$) or a perfluoroacidfluoride of the formula $F(CF_2)_mCFO$ as described more fully in French Patent 1,362,548, the product is $$F(CF_2)_mCF_2O[CF(CF_3)CF_2O]_nCF(CF_3)CFO$$

where $m$ is 0–5. When the polymerization is carried out in the presence of a perfluoroketone of the formula $$F(CF_2)_xC(O)(CF_2)_4F$$

as described in Selman, U.S. 3,274,239, the product has the formula

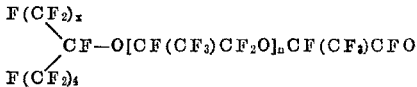

where $x$ and 4 are 1–4 and the total of $x+y$ is 2–5. Thus $R_f$ may be a branched or straight-chain perfluoroalkyl group of 1–6 carbon atoms.

Acid fluorides prepared by polymerization of mixtures of hexafluoropropylene and oxygen are taught by Passetti, Sianesi and Corti in Die Makromolekulare Chemie 86, pages 308–311 (1965); Sianesi and Fontanelli in Die Makromolekulare Chemie 102, pages 115–124 (1967); and French Patent 1,434,537. The polymerization is carried out at temperatures of from about −100° C. to 25° C. in the presence of ultraviolet radiation.

One method of preparing the perfluoroalkyletheramidoalkyltrialkoxysilanes of the present invention is by the reaction of one of the aforementioned perfluoroalkyl ether acid fluorides with an aminoalkyltrialkoxysilane of the formula $RNH-R'-Si(OR'')_3$ wherein R is hydrogen or an alkyl group having from 1 to 6 carbon atoms, R' is a connecting group selected from the group consisting of branched or straight chained alkylene groups having from 1 to 12 carbon atoms and $$-CH_2-CH_2-\overset{H}{N}(CH_2)_3$$

Aminoalkyltrialkoxysilanes such as $$NH_2(CH_2)_3Si(OC_2H_5)_3$$

and $NH_2-(CH_2)_2NH(CH_2)_3Si(OCH_3)_3$ are available commercially and are sold as "A–1100 Silane" and "A–1120 Silane" by Union Carbide Corp.

The reaction of the perfluoroalkyl ether acid fluoride with the aminoalkyltrialkoxysilane can be carried out in the presence of a solvent such as ether, dioxane, tetrahydrofuran, trichlorotrifluoroethane and the like or with excess amine. It is preferable to carry out the reaction in a solvent. When a solvent is used, the temperature in the range of about 20° C. to the reflux temperature of the reaction mixture is generally used, preferably from 20° C. to 50° C.

A more preferred preparation of the compounds of this invention involves first converting the perfluoroalkyl ether acid fluoride to the corresponding alkyl perfluoroalkyl ether acid ester. The methyl ester of the formula $$R_fO(C_3F_6O)_nCF(CF_3)CO_2CH_3$$

is preferred. The esters are prepared by well-known esterification procedures such as those taught by Dresslin et al., in U.S. 2,567,011 and by Moore et al. in U.S. 3,250,808. Preferably the esterification is carried out by reacting perfluoroalkyl ether acid fluoride with excess methanol at 10–20° C., optionally in an inert solvent such as ether, dioxane, tetrahydrofuran, trichlorotrifluoroethane and the like in the presence of sufficient pyridine to consume the hydrogen fluoride formed. In place of methanol, other alcohols such as ethanol, propanol, butanol or the like may be used with equal efficiency.

The desired compound of this invention is then prepared by reacting the alkyl ester with aminoalkyltrialkoxysilane. The reaction is carried out, usually, in an inert solvent at temperatures from about 20° C. to the reflux temperature of the reaction mixture. Any solvent which dissolves both reactants and products and is inert toward the ester and amine is useful. Water is undesirable in the system since water can bring about hydrolysis of the alkoxy groups on the silicon atom, thus the solvent used must be anhydrous. By anhydrous is meant that the solvent should be essentially free of water.

Another procedure for preparing the compounds of this invention involves the steps of (1) formation of alkenylamide of perfluoroalkyl ether acid, (2) addition of trisubstituted silane, $HSiX_3$ to the alkenylamide, where X is an alkoxy or chlorine or bromine, and (3) replacement of X when X is chlorine or bromine with an alkoxy group. The reaction steps may be illustrated by the following equations:

Step 1

$$R_fO[C_3F_6O]_nCF(CF_3)COF+RNH(CH_2)_yCH=CH_2 \rightarrow$$
$$R_fO[C_3F_6O]_nCF(CF_3)CON(R)(CH_2)_yCH=CH_2+HF$$

Step 2

$$R_fO[C_3F_6O]_nCF(CF_3)CON(R)(CH_2)_y$$
$$CH_2CH_2SiX_3+3R''OH \rightarrow$$
$$R_fO[C_3F_6O]_nCF(CF_3)CON(R)(CH_2)_yCH_2CH_2SiX_3$$

Step 3

$$R_fO[C_3F_6O]_nCF(CF_3)CON(R)(CH_2)_y$$
$$CH_2CH_2SiX_3+3R''OH \rightarrow$$
$$R_fO[C_3F_6O]_nCF(CF_3)CON(R)(CH_2)_y$$
$$CH_2CH_2Si(OR'')_3+3HX$$

The formation of alkenylamide of perfluoroalkyl ether acid in Step 1 is carried out as described above. The alkenylamines suitable for the preparation of alkenylamide of perfluoroalkyl ether acid include allylamine, allylmethylamine, allylethylamine, 4-aminobutene-1, 4-methylaminobutene - 1, 4 - ethylaminobutene-1, 4-butylaminobutene-1, 5-aminopentene-1, 5-methylaminopentene-1, 5-propylaminopentene-1, 4-aminopentene-1, 4-methylaminopentene-1, 6-aminohexene-1, 6-ethylaminohexene-1, 6 - butylaminohexene - 1, 5-aminohexene-1, 5-amino-4-methylpentene-1, 4-amino-4, 4-dimethylbutene-1, 5-amino-4,5 - dimethylpentene - 1, 5-methylamino-4,5-dimethylpentene-1, 11-aminoundecene-1, 12-aminododecene-1, and diamines such as 2-aminoethylallylamine, 2-aminoethylallylmethylamine and 2-aminoethylallylpropylamine.

The reaction of Step 2, that of addition of a silane to an olefin, is well known in the field of silicon chemistry. The addition of a silane of the formula $HSiX_3$ where X is chlorine, bromine, or alkoxy to olefins, is usually carried out at elevated temperatures and, if desired, in the presence of catalytic materials such as platinum, platinum salts and peroxides. The addition of silanes to olefins are taught in Sommer, Pietrusza and Whitmore, J. Am. Chem. Soc., 69 p. 188 (1947); Beukhard and Krieble ibid. 69 2687 (1947); Barry, De Pree, Gilkey, and Hook ibid. 69 2916 (1941); U.S. Pat. 2,637,738 and in U.S. Pat. 3,012,006.

The reaction of Step 3, that of alcoholysis of X group of the silane produced in Step 2 when the $HSiX_3$ used is a silane in which X is a chlorine or a bromine is carried out by heating the silane produced in Step 2 in a suitable alcohol. If desired, catalytic amounts of acid or base may be used. Of course, when $HSiX_3$ used in Step 2 is trialkoxysilane, the product obtained in Step 2 is the product of this invention and therefore Step 3 of the above sequence of reactions is not necessary. The alcoholysis of alkyltrihalosilane is described in "Organic Silicon Compounds" K. A. Andrianov, State Scientific Technical Publishing House for Chemical Literature, Moscow 1955 U.S. Dept. of Commerce Office of Technical Services, translation p. 329 and in "Organosilicon Compounds" C. Eaborn, Academic Press, N.Y. 1960, p. 289.

While specific methods for the preparation of the compounds of this invention have been described above, it is not intended that this invention be limited to any particular method of synthesis. Other methods may occur to those skilled in the art.

The perfluoroalkyletheramidoalkyltrialkoxysilanes of this invention are useful in imparting oil and water repellency to a glass surface which at the same time is rendered scratch-resistant. Additionally, the compounds of this invention are valuable in the treatment of glass or metal surfaces in that the compound deposited on the surface is durable.

Oil and water repellency characteristics of a surface are desirable on a glass surface when glass is used as, e.g., a windshield, particularly as an aircraft windshield. In order to provide adequate visibility during rain, particularly in a high speed aircraft, it is desirable that rain drops impinging on the surface of glass be drawn into beads of water rather than spread on the surface and thus be removed readily by high velocity slipstream across the windshield. Oil repellency of a glass surface is also desirable in an aircraft windshield since such aircraft windshield is often exposed to contact with hydrocarbon fuels and lubricants. Durability of an oil and water repellent on the windshield surface is highly desirable in order that the time interval required for renewing the repellency effects is prolonged to reduce cost.

additional four hours at 10–15° C. The reaction mixture was then transferred to a distillation assembly whereby the ethanol solvent and the unreacted fluoroester were removed by reduced-pressure distillation by heating the contents of the distillation flask to 50° C. at 1 mm. Hg pressure. The residue in the flask which was a slightly yellow liquid weighing 32 g. was the desired product $C_3F_7OCF(CF_3)CF_2OCF(CF_3)CONH$
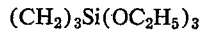

obtained in the yield of 95.4%.

Elementary analyses were as follows. Calculated (percent): fluorine, 47.2; nitrogen, 2.04; silicon, 4.10. Found (percent): fluorine, 47.1; nitrogen, 2.05; silicon, 4.15.

Examples 2–4

Using the procedure described in Example 1, the following perfluoroalkyletheramidoalkyltrialkoxysilanes were prepared.

| Ex. | Compound | Percent fluorine Found | Percent fluorine Calc'd | Percent silicon Found | Percent silicon Calc'd | Percent yield |
|---|---|---|---|---|---|---|
| 2 | $C_3F_7O[CF(CF_3)CF_2O]_8CF(CF_3)CONH(CH_2)_3Si(OC_2H_5)_3$ | 58.8 | 58.9 | 1.4 | 1.5 | 96.0 |
| 3 | $C_3F_7O[CF(CF_3)CF_2O]CF(CF_3)CONH(CH_2)_2NH(CH_2)_3Si(OCH_3)_3$ | 46.1 | 46.2 | 4.0 | 4.0 | 96.1 |
| 4 | $C_3F_7O[CF(CF_3)CF_2O]_8CF(CF_3)CONH(CH_2)_2NH(CH_2)_3Si(OCH_3)_3$ | 58.3 | 58.4 | 1.4 | 1.5 | 97.9 |

The perfluoroalkyletheramidoalkyltrialkoxysilanes of this invention confer excellent oil and water repellency to glass surface which repellency is durable.

The compounds of this invention are also useful as anticorrosion agent for steel surfaces.

The preferred compounds of this invention are the perfluoroalkyletheramidoalkyltrialkoxysilanes of the formula $R_fO[CF(CF_3)CF_2O]_nCF(CF_3)CON(R)R'Si(OR'')_3$ wherein $R_f$ is $C_3F_7$—, $n$ is an integer from 1–8, R is a hydrogen, R' is a —$CH_2CH_2CH_2$— or —$CH_2CH_2\overset{H}{N}$—$CH_2CH_2CH_2$— and R" is $CH_3$— or $C_2H_5$—, i.e., $C_3F_7O[CF(CF_3)CF_2O]_{1-8}CF(CF_3)$
    $CON(H)CH_2CH_2CH_2Si(OC_2H_5)_3$ and

EXAMPLES

The following examples are intended to be merely illustrative of the invention and not in limitation thereof. Unless otherwise indicated, all quantities are by weight.

Example 1.—Preparation of $C_3F_7OCF(CF_3)CF_2OCF$
    $(CF_3)CONH(CH_2)_3Si(OC_2H_5)_3$ The methyl ester of the poly(hexafluoropropyleneoxide) acid $C_3F_7OCF(CF_3)CF_2OCF(CF_3)CO_2CH_3$, 27.5 g. was dissolved in 100 ml. of absolute ethanol in a 250-ml. reaction flask equipped with a thermometer, an agitator and an addition funnel. The reaction flask was protected from atmospheric moisture by a drying tube containing anhydrous calcium chloride as desiccant. The contents of the flask were cooled to 10–15° C. by placing a cold water bath around the flask. Aminopropyltriethoxysilane, $NH_2(CH_2)_3Si(OC_2H_5)_3$ ("A-1100 Silane" from Union Carbide) 10.1 g. dissolved in 50 ml. of absolute ethanol was added over a period of one hour from the addition funnel while maintaining the temperature of the reaction mixture in the temperature range of 10–15° C. Agitation of the reaction mixture was continued for Example 5

The utility of perfluoroalkyletheramidoalkyltrialkoxysilanes of the present invention as oil and water repellent agents and the durability of the protective coating formed is illustrated in this example. The amidosilanes of Examples 1, 2, 3 and 4 were each dissolved in ethanol to form a 1% (wt./wt.) solution. Glass microscope slides were dipped into each of the solutions. After drying, the slides were observed to be both hydrophobic and oleophobic, i.e. water or oil placed on the surface of the treated glass formed beads of water or oil and could be shaken off readily. The durability of the protective film was demonstrated by placing the treated slides in a dichromate-sulfuric acid cleaning solution at ambient temperature for a few hours. After removing the slides from the dichromate-sulfuric acid cleaning solution, the slides were rinsed in water and dried. Tests for oil and water repellency as described above were repeated with the dichromate-sulfuric acid treated slides and showed no loss in oil and water repellency.

Example 6

The utility of the perfluoroalkyletheramidoalkyltrialkoxysilanes in imparting scratch-resistance to glass is illustrated in this example. Glass microscope slides were dipped into ethanol solutions of amidosilane prepared by dissolving each of the amidosilanes of Examples 1, 2, 3 and 4 in ethanol as described in Example 5. After drying, attempts were made to scratch the treated surfaces of the glass slides with a three-cornered metal file. It was found that the treated glass surfaces were very difficult to scratch as compared with the untreated slides.

Example 7

The utility of the perfluoroalkyletheramidoalkyltrialkoxysilanes in treating windshields of vehicles is illustrated in this example. A clean automobile windshield was brushed with a 5% solution of the amidosilane of Example 1 in 1,2,2-trichloro-1,1,2-trifluoroethane. After allowing the chlorofluorocarbon solvent to evaporate, the windshield surface was found to be non-wetting. The automobile was operated in a normal usage thus exposing the treated windshield surface to the prevailing atmospheric conditions including the customary windshield cleanings at service stations. After 45 days, the windshield was still non-wetting. Windshield wipers were needed to wipe away the water droplets at low automobile speed, i.e. less than 45 miles per hour, but at higher speeds, the water droplets were removed effectively by the high velocity slipstream.

Example 8

The utility of the perfluoroalkyletheramidoalkyltrialkoxysilanes in providing corrosion resistance to steel surfaces is illustrated in this example. Coupons of 1020 steel whose dimensions were 0.01″ x 0.5″ x 3″ were dipped into one weight percent solution of the amidosilanes of Examples 1, 2, 3 and 4 in 1,2,2-trichloro-1,1,2-trifluoroethane. (Ethanol has also been used as solvent for the amidosilanes.) After drying, the treated steel coupons were immersed in 10 weight percent aqueous hydrochloric acid. The steel coupons were examined at various intervals up to five days. The experimental data are summarized below.

CORROSION TEST RESULTS

| Compound of: | Appearance of coupons |
|---|---|
| Example 1 | Clean, bright, no corrosion after 5 days. |
| Example 2 | Clean, bright, no corrosion after 5 days. |
| Example 3 | Clean, bright, no corrosion after 5 days. |
| Example 4 | Clean, bright, no corrosion after 5 days. |
| None | Badly corroded after 5 days. |

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. Perfluoroalkyletheramidoalkyltrialkoxysilanes having the formula $$R_fO[CF(CF_3)CF_2O]_nCF(CF_3)CON(R)-R'Si(OR'')_3$$

wherein $R_f$ is a perfluoroalkyl radical having from 1 to 6 carbon atoms, $n$ is an integer of from 0 to 8, R is a hydrogen or an alkyl group having from 1 to 6 carbon atoms, R′ is an alkylene having from 1 to 12 carbon atoms or

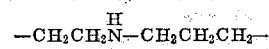

and R″ is an alkyl radical having from 1 to 6 carbon atoms.

2. Perfluoroalkyletheramidoalkyltrialkoxysilanes according to claim 1 wherein $R_f$ is $C_3F_7-$, $n$ is an integer from 1 to 8, R is hydrogen, R′ is $-CH_2CH_2-$ or

and R″ is $CH_3-$ or $C_2H_5-$.

3. A perfluoroalkyletheramidoalkyltrialkoxysilane according to claim 2 having the formula

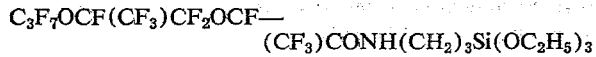

4. A perfluoroalkyletheramidoalkyltrialkoxysilane according to claim 2 having the formula

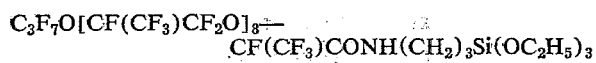

5. A perfluoroalkyletheramidoalkyltrialkoxysilane according to claim 2 having the formula

6. A perfluoroalkyletheramidoalkyltrialkoxysilane according to claim 2 having the formula

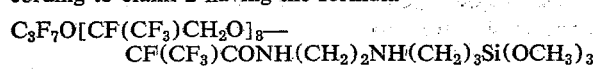

References Cited

UNITED STATES PATENTS

| 3,012,006 | 12/1961 | Holbrook et al. | 260—448.8 R X |
| 3,440,261 | 4/1969 | Saam | 260—448.8 R X |
| 3,494,951 | 2/1970 | Berger | 260—448.8 R X |
| 3,560,542 | 2/1971 | Kim et al. | 260—448.8 R X |

JAMES E. POER, Primary Examiner

P. F. SHAVER, Assistant Examiner

PO-1050
(5/69)

UNITED STATES PATENT OFFICE
CERTIFICATE OF CORRECTION

Patent No. 3,646,085                             Dated February 29, 1972

Inventor(s)   Philip Lee Bartlett

It is certified that error appears in the above-identified patent and that said Letters Patent are hereby corrected as shown below:

Column 3, line 3, "$F(CF_2)_x C(O)(CF_2)_4 F$" should be -- $F(CF_2)_x C(O)(CF_2)_y F$ --; line 10, "$F(CF_2)_4$" should be -- $F(CF_2)_y$ --; line 11, "4" should be -- y --. Column 4, line 17 "$CH_2CH_2SiX_3 + 3R"OH \rightarrow$" should be -- $CH=CH_2 + HSiX_3$ --. Column 8, Claim 6, line 32, "$C_3F_7O[CF(CF_3)CH_2O]_8-$" should be -- $C_3F_7O[CF(CF_3)CF_2O]_8-$ -- .

Signed and sealed this 23rd day of January 1973.

(SEAL)
Attest:

EDWARD M. FLETCHER, JR.
Attesting Officer

ROBERT GOTTSCHALK
Commissioner of Patents